B. F. SCHMIDT.
BRAKE OPERATING MEANS FOR MOTOR VEHICLES.
APPLICATION FILED APR. 8, 1919.

1,394,645.

Patented Oct. 25, 1921.

INVENTOR
*B. F. Schmidt*
BY
*Perry S. Webster*
ATTORNEY

UNITED STATES PATENT OFFICE.

BENJAMIN F. SCHMIDT, OF EXETER, CALIFORNIA.

BRAKE-OPERATING MEANS FOR MOTOR-VEHICLES.

1,394,645.

Specification of Letters Patent.  Patented Oct. 25, 1921.

Application filed April 8, 1919. Serial No. 288,442.

*To all whom it may concern:*

Be it known that I, BENJAMIN F. SCHMIDT, a citizen of the United States of America, residing at Exeter, in the county of Tulare and State of California, have invented certain new and useful Improvements in Brake-Operating Means for Motor-Vehicles; and I do declare the following to be a clear, full, and exact description of the same, reference being had to the accompanying drawings and to the characters of reference marked thereon, which form a part of this application.

This invention relates to improvements in bake operating means for motor vehicles, the principal object of the invention being to provide a means for applying the brakes of a motor vehicle, especially of the pleasure type, without the necessity of having such means project up through the floor of the car, as is now almost universally the case.

This feature has various disadvantages. It very often happens that the person or persons who are sitting in the front seats of the car beside the driver are crowded in, or have one foot or leg over the brake lever, or a package on the floor may jam behind the same. Any of these common occurrences are a source of annoyance and danger to the driver, who should have the brake lever always accessible in case of emergency.

With my improved method of operation, the brake handle projects horizontally from under the cowl at a point where interference therewith by anyone other than the driver of the car is practically impossible.

My novel positioning of the operating hand for the brakes is especially advantageous when used on vehicles equipped with the type of pre-selector gear change apparatus as shown in my patent dated October 3, 1916, No. 1,200,431. This mechanism does away with the necessity of a gear change lever and then by positioning my brake operating handle away from the floor of the car, this leaves the space adjacent the front seat entirely unobstructed.

Another object of the invention is to provide a simple and inexpensive means and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1:
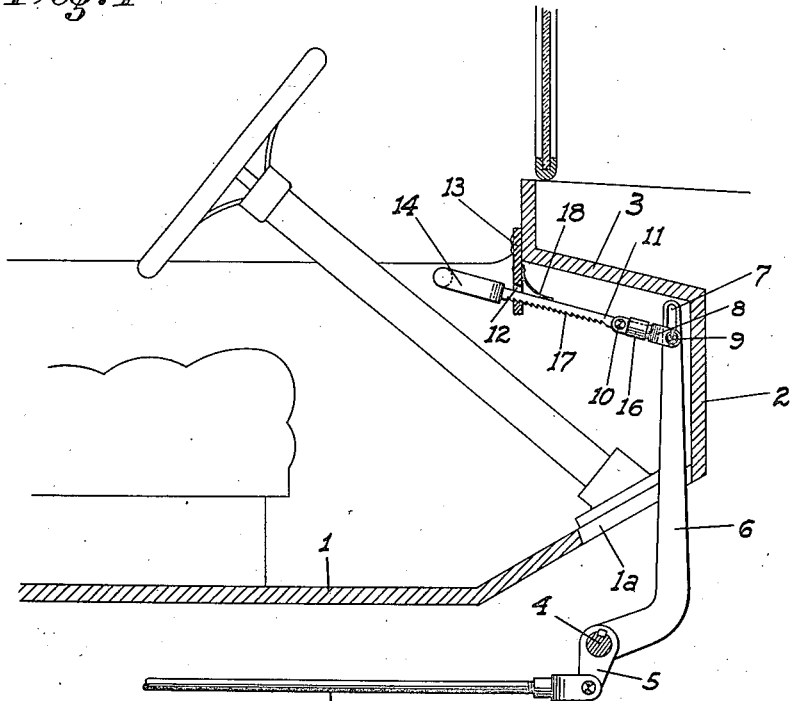
Figure 1 is a sectional elevation of a fragmentary portion of a motor vehicle of standard design, showing the arrangement of my improved brake applying means therein.
Figure 3:
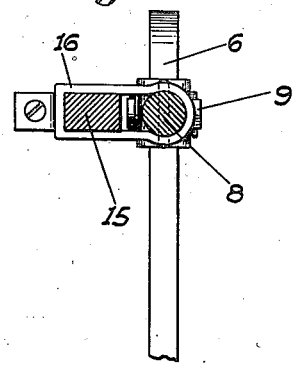
Fig. 3 is a fragmentary section taken on a line 3—3 of Fig. 2.
Figure 2:
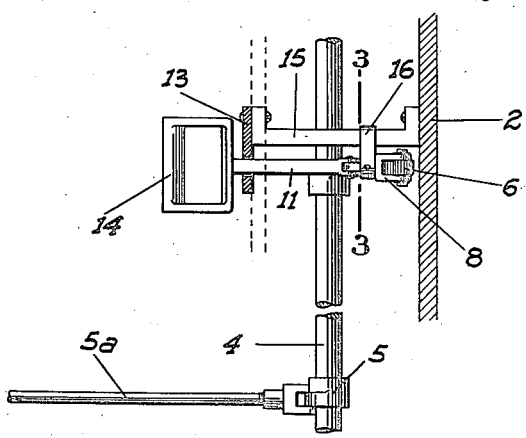
Fig. 2 is a top plan view of the said means, with the cowl removed.

Referring now more particularly to the characters on the drawings, the numeral 1 indicates the floor of the car having the usual dash board 2 rising therefrom, and an overhanging portion 3, as is common practice in the present design of motor vehicles of the type particularly specified.

Under the floor is the usual transverse forward brake shaft 4, having an arm 5 depending therefrom, to which arm is pivoted the brake pull-rod $5^a$ passing back to the usual brake system not here shown.

Projecting upwardly from the shaft 4 through a slot $1^a$ in the floor and positioned to normally rest in a vertical position adjacent the dash board 2 is a lever arm 6 provided with a slot 7 in its upper end, which is just under the overhung portion 3 of the dash. Adapted to straddle the upper end of the arm 6 is a yoke or fork 8 having a pin 9 slidable in the slot 7, such yoke being pivoted at its outer end, as at 10, to a bar 11 projecting horizontally and substantially parallel to the slope of the overhang of the dash, and passing through an orifice 12 provided in a plate 13 attached to the outer face of the dash-board 2.

A handle 14 is secured to the outer end of the bar 11 whereby the bar may be pulled to set the brakes.

Positioned alongside the bar 11 and substantially parallel thereto is a bar 15 rigidly mounted to the dash-board and to the plate 13, on which bar slides a guide strap 16 passing therearound and also around the shank of the yoke 8 and being secured thereto. This guide maintains the relative horizontal alinement of the bar 11 at all positions of its travel. Thus it will be seen that a pull on the handle 14 will be transmitted through the arm 6 to the brake rod 5, the slot 7 in said arm allowing of freedom of movement of the pin 9 on the yoke 8 without changing the horizontal alinement of the bar 11. The bar 11 may be set at any position in its travel by any suitable pawl and ratchet means as may be desired.

I have here shown ratchet teeth 17 on the underside of the bar 11, adapted to engage with the lower edge of the orifice 12, which is similarly notched, this orifice allowing of sufficient play of the bar 11 vertically to permit the same to clear the teeth when it is desired to apply or release the brakes.

A spring 18 is attached to the plate 13 and bears against the bar 11 to hold the teeth on the same normally in contact with the notches in the orifice 12.

It will thus be seen that I have provided a simple and efficient means for applying the brakes while keeping the floor clear of any projecting obstructions.

It will also be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. The combination with a shaft, and a lever-arm fixed thereto and projecting upwardly therefrom, of a link flexibly connected to the arm to allow relative vertical movement, said link being positioned at an angle to the arm, a rigid guide bar extending rearwardly of the arm and parallel to the link, a guide strap fixed to the link, and engaging the bar, a pull rod pivoted to the rear end of the link, and means coöperating with the rod for allowing the same to be pulled without its being raised and for automatically holding the same set at any desired point in its travel.

2. The combination with a shaft, and a lever-arm fixed thereto and projecting upwardly therefrom, of a link flexibly connected to the arm to allow relative vertical movement, said link being positioned at an angle to the arm, means for maintaining the link in a constant plane with any movement of the arm, a pull rod pivoted to the rear end of the link, a slotted fixed plate to the rear of the arm through which the rod passes, forwardly projecting ratchet teeth on the rod adapted to engage the adjacent face of the slot, and a fixed spring bearing on the rod on the face thereof opposite to the teeth thereon to hold the same normally in contact with the slot.

In testimony whereof I affix my signature in presence of two witnesses.

BENJAMIN F. SCHMIDT.

Witnesses:
VERADINE WARNER,
BERNARD PRIVAT.